United States Patent
Johnson

(10) Patent No.: US 8,836,953 B2
(45) Date of Patent: Sep. 16, 2014

(54) OCT SYSTEM WITH PHASE SENSITIVE INTERFERENCE SIGNAL SAMPLING

(71) Applicant: Axsun Technologies, Inc., Billerica, MA (US)

(72) Inventor: Bartley C. Johnson, North Andover, MA (US)

(73) Assignee: Axsun Technologies, Inc., Billerica, MA (US)

(*) Notice: Subject to any disclaimer, the term of this patent is extended or adjusted under 35 U.S.C. 154(b) by 0 days.

(21) Appl. No.: 13/670,938

(22) Filed: Nov. 7, 2012

(65) Prior Publication Data

US 2014/0125991 A1    May 8, 2014

(51) Int. Cl.
*G01B 11/02* (2006.01)
*G01B 9/02* (2006.01)

(52) U.S. Cl.
CPC .............. *G01B 9/02* (2013.01); *G01B 9/02069* (2013.01); *G01B 9/02091* (2013.01); *G01B 9/02004* (2013.01)
USPC .......................................... 356/497; 356/450

(58) Field of Classification Search
USPC .................... 356/497, 450, 479, 477
See application file for complete search history.

(56) References Cited

U.S. PATENT DOCUMENTS

| | | | |
|---|---|---|---|
| 2009/0284749 A1* | 11/2009 | Johnson et al. | 356/497 |
| 2011/0178413 A1 | 7/2011 | Schmitt et al. | |
| 2011/0255095 A1 | 10/2011 | Jiang et al. | |
| 2012/0013914 A1 | 1/2012 | Kemp et al. | |
| 2012/0162659 A1 | 6/2012 | Goldberg et al. | |
| 2013/0308136 A1* | 11/2013 | Kuznetsov et al. | 356/479 |

OTHER PUBLICATIONS

Motaghiannezam, S.M., et al., "Differential phase-contrast, swept-source optical coherence tomography at 1060 nm for in vivo human retinal and choroidal vasculature visualization," Journal of Biomedical Optics, vol. 17(2), Feb. 2012, pp. 026011-1 to 026011-5.
Tsai, et al., "Visualization of Hair Follicles Using High-Speed Optical Coherence Tomography Based on a Fourier Domain Mode Locking Laser," Laser Physics, 2012, vol. 22:4, pp. 791-796.
International Search Report and Written Opinion of the International Searching Authority mailed Dec. 10, 2013, from counterpart International Application No. PCT/US2013/061727.

* cited by examiner

*Primary Examiner* — Tri T Ton
(74) *Attorney, Agent, or Firm* — Houston & Associates LLP

(57) ABSTRACT

An OCT system and particularly its clock system generates a k-clock signal but also generates an optical frequency reference sweep signal that, for example, indicates the start of the sweep or an absolute frequency reference associated with the sweep at least for the purposes of sampling of the interference signal and/or processing of that interference signal into the OCT images. This optical frequency reference sweep signal is generated at exactly the same frequency of the swept optical signal from sweep to sweep of that signal. This ensures that the sampling of the interference signal occurs at the same frequencies, sweep to sweep. Such a system is relevant to a number of applications in which it is important that successive sweeps of the swept optical signal be very stable with respect to each other.

21 Claims, 8 Drawing Sheets

OCT SYSTEM WITH PHASE SENSITIVE INTERFERENCE SIGNAL SAMPLING

RELATED APPLICATIONS

This application is related to U.S. application Ser. No. 13/670,935 filed on Nov. 7, 2012, entitled "OCT system with tunable clock system for flexible data acquisition", now U.S. Patent Publication No.: US 2014/0125986 A1.

BACKGROUND OF THE INVENTION

Optical coherence analysis relies on the use of the interference phenomena between a reference wave and an experimental wave or between two parts of an experimental wave to measure distances and thicknesses, and calculate indices of refraction of a sample. Optical Coherence Tomography (OCT) is one example technology that is used to perform high-resolution cross sectional imaging. It is often applied to imaging biological tissue structures, for example, on microscopic scales in real time. Optical waves are reflected from an object or sample and a computer produces images of cross sections or three-dimensional volume renderings of the sample by using information on how the waves are changed upon reflection.

There are a number of different classes of OCT, but Fourier domain OCT currently offers the best performance for many applications. Moreover, of the Fourier domain approaches, swept-source OCT has distinct advantages over techniques such as spectrum-encoded OCT because it has the capability of balanced and polarization diversity detection. It also has advantages for imaging in wavelength regions where inexpensive and fast detector arrays, which are typically required for spectrum-encoded OCT, are not available.

In swept source OCT, the spectral components are not encoded by spatial separation, but they are encoded in time. The spectrum is either filtered or generated in successive optical frequency sampling intervals and reconstructed before Fourier-transformation. Using the frequency scanning swept source, the optical configuration becomes less complex but the critical performance characteristics now reside in the source and especially its frequency sweep rate and tuning accuracy.

High speed frequency tuning, or high sweep rates, for OCT swept sources is especially relevant to in-vivo imaging where fast imaging reduces motion-induced artifacts and reduces the length of the patient procedure. It can also be used to improve resolution.

Traditionally, the swept sources for OCT systems have been tunable lasers. The advantages of tunable lasers include high spectral brightness and relatively simple optical designs. Another class of swept sources that has the potential to avoid inherent drawbacks of tunable lasers is filtered amplified spontaneous emission (ASE) sources that combine a broadband light source, typically a source that generates light by ASE, with tunable filters and amplifiers.

In order to compensate for instabilities and/or non-linearities in the tuning of the OCT swept sources, a sampling clock (k-clock) is often employed to enable sampling at equally spaced increments in the optical frequency domain (k-space). This k-clock must usually be delayed to match the delay associated with the optical signals in the sample and in the reference arms of the interferometer of the OCT system.

SUMMARY OF THE INVENTION

In a number of applications, it is important that successive sweeps of the swept optical signal be very stable with respect to each other. One specific example is phase sensitive OCT. This requires that the sampling of the interference signal occurs at exactly the same frequency/wavelength on every axial line (A-line). Such phase sensitive OCT technology has particular applications in Doppler OCT, synthetic aperture imaging, and in the subtraction of background noise sources from the OCT image.

The present invention concerns an OCT system and particularly a clock system that is used in the OCT system. Preferably, this clock system generates a k-clock signal but also generates an optical frequency reference sweep signal that indicates, for example, the start of the sweep or an absolute optical frequency reference associated with the sweep at least for the purposes of sampling of the interference signal and/or processing of that interference signal into the OCT images. This optical frequency reference sweep signal is generated at exactly the same frequency of the swept optical signal from sweep to sweep of that signal. This ensures that the sampling of the interference signal occurs at the same optical frequencies, sweep to sweep.

In general, according to one aspect, the invention features an optical coherence tomography system. This system comprises an interferometer that divides a swept optical signal between a reference arm and a sample arm and then combines optical signals returning from the reference arm and sample arm to generate an interference signal. An optical swept source system generates the swept optical signal. A clock system is used to generate k-clock signals in response to frequency sweeping of the swept optical signal and to generate an optical frequency reference sweep signal indicating that the instantaneous frequency of the swept optical signal is at a particular sweep frequency, or other absolute frequency, for example. A detection system then detects the interference signal in response to the k-clock signals to generate evenly spaced samples of the interference signal in the frequency domain and uses the optical frequency reference sweep signal to stabilize sampling across the successive sweeps of the swept optical signal with respect to each other.

In the preferred embodiment, the clock system comprises a clock/trigger optical module that generates the k-clock signals and an optical trigger signal to indicate the sweep frequency by spectrally filtering the swept optical signal. Preferably, a trigger logic module is then used to generate the optical frequency reference sweep signal to indicate a start of the sweep based on the optical trigger signal and an electronic trigger signal generated by a controller of the optical swept source system.

In a current embodiment, the clock/trigger optical module comprises a k-clock spectral filter that filters the swept optical signal based on the optical frequency sampling interval and a sweep start filter that indicates a sweep start frequency of the swept optical signal. In one example, the k-clock spectral filter is an etalon and the sweep start filter is an etalon. Alternatively, interferometers are used.

In general, according to another aspect, the invention features an optical coherence tomography method. This method comprises dividing the swept optical signal between a reference arm and a sample arm and combining the optical signals returning from those arms to generate an interference signal. K-clock signals are generated in response to the frequency sweeping of the swept optical signal. An optical frequency reference sweep signal is generated and indicates that the frequency of the swept optical signal is at a particular sweep start frequency, or other absolute frequency, in one example. The interference signals are then detected in response to the k-clock signals to generate evenly spaced samples of the interference signal in the frequency domain, and the optical frequency reference sweep signal is used to stabilize the sweeps of the swept optical signal with respect to each other.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of and detailed approaches to implement the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and wilt not be interpreted in an idealized or overly formal sense unless expressly so defined herein.

Figure 1:
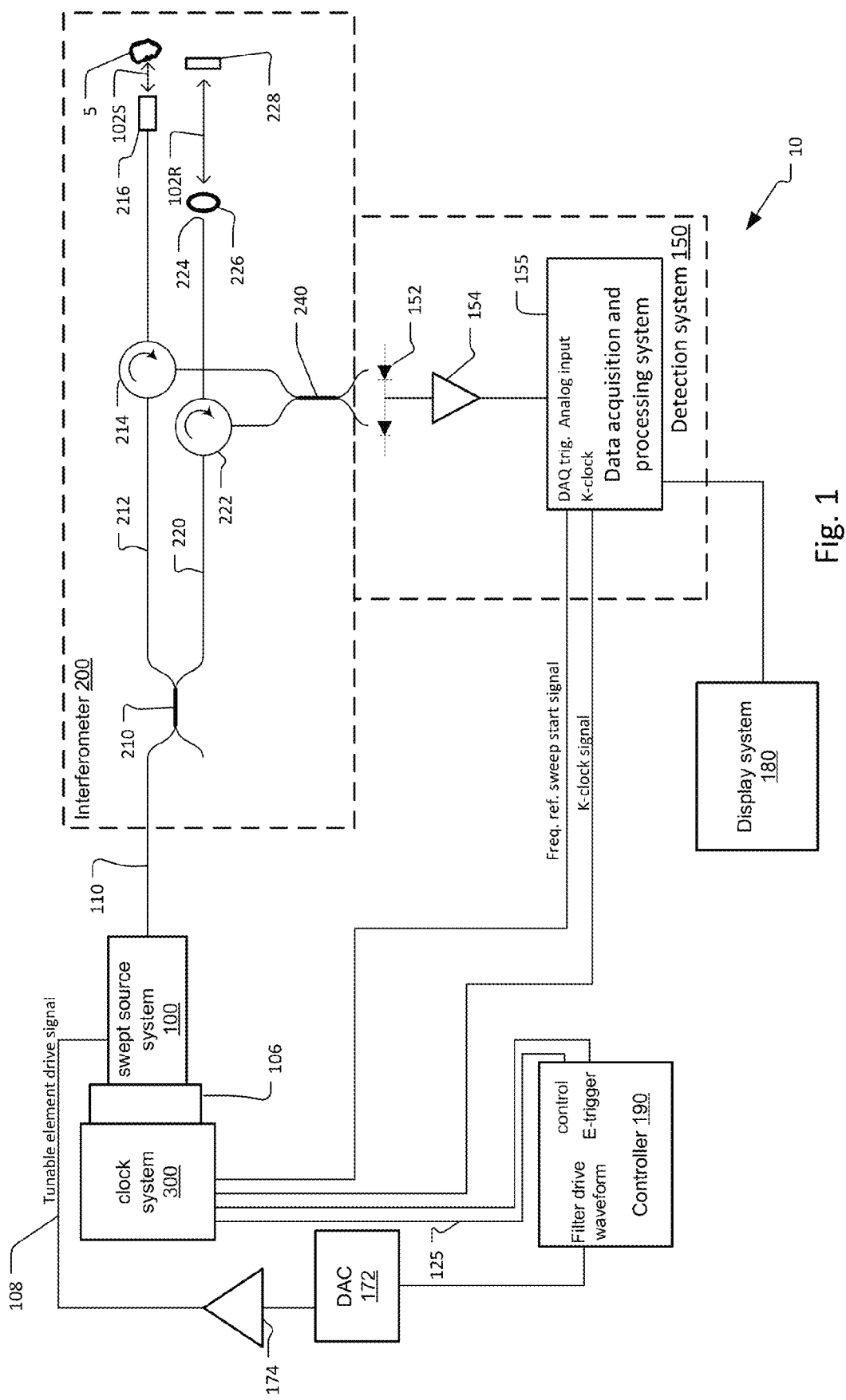
FIG. 1 is a schematic view of an OCT system incorporating the clock system according to the present invention.

Turning now to the drawings, FIG. 1 shows an optical coherence analysis system 10, such as a tomography system, using a clock system 300, which has been constructed according to the principles of the present invention.

An optical swept source system 100 generates the tunable or swept optical signal on optical fiber 110 that is transmitted to interferometer 200. The swept optical signal scans over a scan band with a narrowband emission.

The swept source system 100 is generally intended for high speed tuning to generate swept optical signals that repeatedly scan over the scan band(s) at rates of greater than 1 kiloHertz (kHz). In current embodiments, the multi-sweep rate swept source system 100 tunes at speeds greater than 20 or 100 kHz. In very high speed embodiments, the multi-sweep rate swept source system 100 tunes at speeds greater than 200 or 500 kHz.

Typically, the width of the tuning or scan band is greater than 10 nanometers (nm). In the current embodiments, it is preferably between 50 and 150 nm, although even wider tuning bands are contemplated in some examples. On the other hand, the bandwidth of the narrowband emission has a full width half maximum (FWHM) bandwidth of less than 20 or 10 GigaHertz (GHz), and is usually 5 GHz or less. For optical coherence tomography, this high spectral resolution implies a long coherence length and therefore enables imaging deeper into samples, for example deeper than 5 millimeters (mm). On the other hand, in tower performance applications, for example OCT imaging less than 1 mm deep into samples, broader FWHM passbands are sometimes appropriate, such as passbands of about 200 GHz or less.

The tuning speed can also be expressed in wavelength per unit time. In one example, for an approximately 110 nm tuning band or scanband and 100 kHz scan rate, assuming 60% duty cycle for substantially linear up-tuning, the peak sweep speed would be 110 nm*100 kHz/0.60=18,300 nm/msec=18.3 nm/µsec or faster. In another example, for an approximately 90 nm tuning range and 50 kHz scan rate, assuming a 50% duty cycle for substantially linear up-tuning, the peak sweep speed is 90 nm*50 kHz/0.50=9,000 nm/msec=9.0 nm/µsec or faster. In a smaller tuning band example having an approximately 30 nm tuning range and 2 kHz scan rate, assuming a 80% duty cycle for substantially linear tuning, the peak sweep speed would be 30 nm*2 kHz/0.80=75 nm/msec=0.075 nm/µsec, or faster.

Thus, in terms of scan rates, in the preferred embodiments described herein, the sweep speeds are greater than 0.05 nm/µsec and preferably greater than 5 nm/µsec. In still higher speed applications, the scan rates are higher than 10 nm/µsec.

A controller 190 generates a filter, or tunable element, drive waveform or waveform that is supplied to a digital to analog converter (DAC) 172. This generates a tunable element drive signal 108 that is amplified by amplifier 174 and applied to the optical swept source system 100. In one example, the controller 190 stores the filter drive waveform that linearizes the frequency sweep for one or more tunable optical filters, such as Fabry-Perot tunable filters, tilting gratings, or other tunable optical elements, contained in the swept source system 100.

A clock system 300 is used to generate k-clock signals at equally spaced optical frequency sampling intervals as the swept optical signal is tuned or swept over the scan or tuning band. A swept source signal splitter 106 is used to provide a portion of the swept source signal to the clock system 300. In the following embodiments, the swept source signal splitter 106 is implemented as a fiber coupler. Certainly in alternative embodiments, integrated and/or free space systems could be used, however.

The clock system 300 also generates an optical frequency reference sweep start signal that is used as a data acquisition (DAQ) trigger signal in the illustrated embodiment. This optical frequency reference sweep start signal is generated at a predetermined frequency or wavelength of the swept optical signal. As a result, an absolute optical frequency reference is generated to ensure that the processing of the interference signal occurs at the same optical frequencies of the swept optical signal between successive scans or sweeps of the swept optical signal.

In the illustrated example, a Mach-Zehnder-type interferometer 200 is used to analyze the optical signals from the sample 5. The swept optical signal from the optical swept source system 100 is transmitted on fiber 110 to a 90/10 optical fiber coupler 210 or other beam splitter, to give specific examples. The swept optical signal is divided between a reference arm 220 and a sample arm 212 of the system 10.

The optical fiber of the reference arm 220 terminates at the fiber endface 224. The light 102R exiting from the reference arm fiber endface 224 is collimated by a lens 226 and then reflected by a reference minor 228 to return back, in some exemplary implementations.

The reference mirror 228 has an adjustable fiber to mirror distance, in one example. This distance determines the depth range being imaged, i.e. the position in the sample 5 of the zero path length difference between the reference arm 220 and the sample arm 212. The distance is adjusted for different sampling probes and/or imaged samples. Light returning from the reference mirror 228 is returned to a reference arm circulator 222 and directed to an interference signal combiner 240, such as a 50/50 fiber coupler. In other examples, such as those using free space optical configurations, the combiner 240 is a partially reflecting mirror/beam splitter.

The fiber on the sample arm 212 terminates at the sample arm probe 216. The exiting swept optical signal 102S is focused by the probe 216 onto the sample 5. Light returning from the sample 5 is returned to a sample arm circulator 214 and directed to the interference signal combiner 240.

The reference arm signal and the sample arm signal are combined or mixed in the interference signal combiner 240 to generate an interference signal.

The interference signal is detected by a detection system 150. Specifically, a balanced receiver, comprising two detectors 152, is located at each of the outputs of the fiber coupler 240 in the illustrated embodiment. The electronic interference signal from the balanced receiver 152 is amplified by amplifier 154, such as a transimpedance amplifier.

A data acquisition and processing system 155 of the detection system 150 is used to sample the interference signal output from the amplifier 154. The k-clock signals derived from the clock system 300 are used by the data acquisition and processing system 155 to synchronize system data acquisition with the frequency tuning of the optical swept source system 100. Specifically, the data acquisition and processing system 155 samples the interference signals in response to the k-clock signals to generate evenly spaced samples of the interference signal in the optical frequency domain. The optical frequency reference sweep start signal is used by the data acquisition and processing system 155 to indicate an absolute frequency or wavelength so that successive sweeps of the swept optical signal are referenced with respect to each other such that the sampling of the interference signal occurs at exactly the same, or nearly the same, frequency/wavelength on every A-line.

In the current embodiment, the optical frequency reference sweep start signal indicates, in absolute frequency, when the instantaneous frequency of the swept optical signal is at the frequency associated with the start of the sweep. In response to the sweep start signal, the data acquisition and processing system 155 begins sampling, or stops discarding samples of, the interference signal appearing at the analog input to that system 155. The key relevance of the optical frequency reference sweep start signal is that it provides an absolute frequency reference that is used by the data acquisition and processing system 155 so that successive sweeps are sampled at the same frequencies. So, for example, in other embodiments, the optical frequency reference sweep signal simply represents an arbitrary absolute frequency reference that the data acquisition and processing system 155 uses simply as a reference or calibration point. It could even be an absolute frequency within the scan band or a frequency before the beginning of or after the end of the scan band. In these cases, the data acquisition and processing system 155 would simply use the absolute frequency reference to align the samples generated in response to the k-clock signal from successive scans prior to processing those samples.

A complete data set is collected of the sample 5 by spatially raster scanning the focused probe beam point over the sample 5 in a Cartesian geometry x-y fashion or a cylindrical geometry theta-z fashion. The spectral response at each one of these points is generated from the frequency tuning of the optical swept source system 100. Then, the data acquisition and processing system 155 performs a Fourier transform on the data in order to reconstruct the image and perform a 2D or 3D tomographic reconstruction of the sample 5. This transformed data is displayed by the display system 180.

In one application, the probe 216 is inserted into blood vessels and used to scan the inner walls of arteries and veins. In other examples, other analysis modalities are included in the probe such as intravascular ultrasound (IVUS), forward looking IVUS (FLIVUS), high-intensity focused ultrasound (HIFU), pressure sensing wires, and image guided therapeutic devices. In still other applications, the probe is used to scan different portions of an eye or tooth or other structure of a patient or animal.

Figure 2:
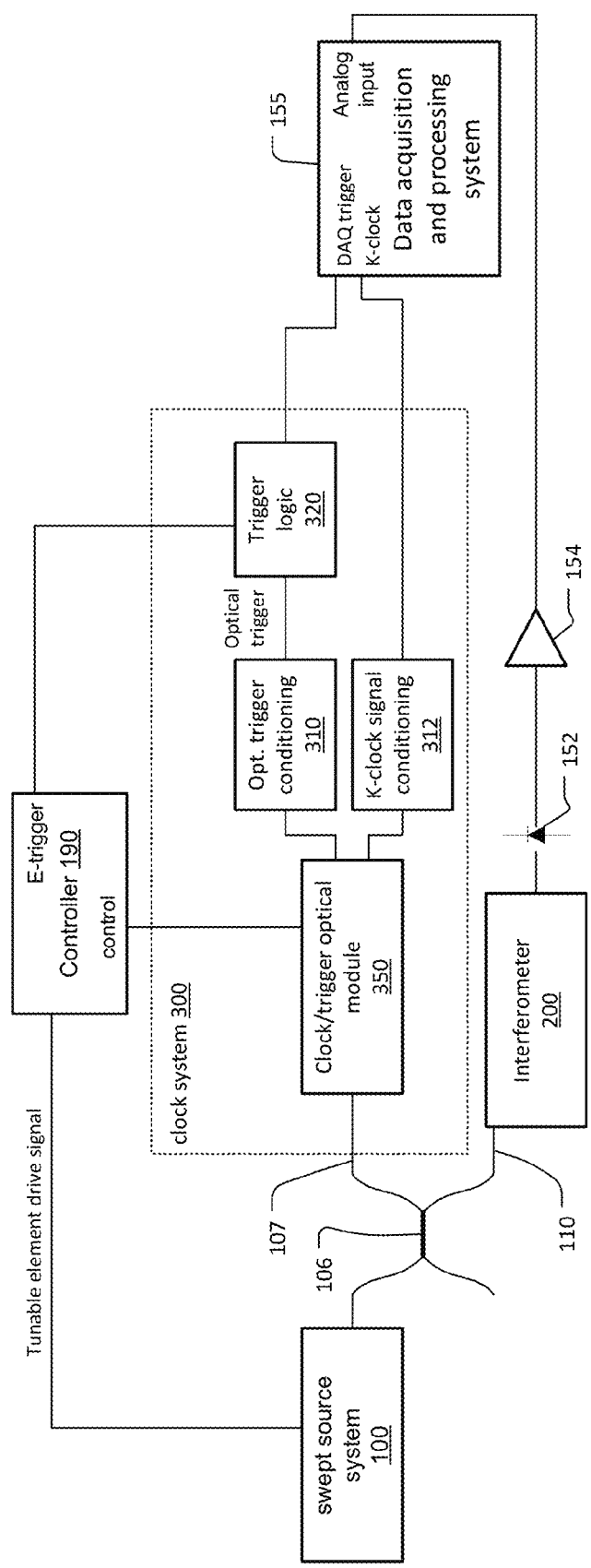
FIG. 2 is a block diagram showing the components of the clock system, according to an embodiment of the present invention.

FIG. 2 shows one implementation of the clock system 300.

In more detail, in the illustrated embodiment, the swept source signal splitter 106 is implemented as a fiber coupler. As a result, a portion of the swept optical signal is provided on the optical fiber 107 to a clock/trigger optical module 350. This module 350 operates under the control of the controller 190. Specifically, the clock/trigger optical module 350 generates two signals, a first signal is used to generate the optical trigger, which indicates that the swept optical signal has reached the absolute frequency or wavelength that is used to define the start of the sweep or otherwise reference the sweep in frequency. The second signal that the module 350 generates typically has a much higher frequency. It is this second signal that is used to derive the k-clock signal.

In more detail, an optical trigger signal conditioning module 310 converts the first signal from the clock/trigger optical module 350 into a binary or two-state signal, if necessary, that is defined as the optical trigger signal. This is provided to a trigger logic module 320. The trigger logic module 320 combines the optical trigger signal with the electronic trigger (E-trigger) signal that is generated by the controller 190. The electronic trigger signal is generated by the controller 190 with the controller signals the optical swept source system 100 to begin the sweep of the swept optical signal through the scan band and the generation of the tunable element drive signal 108. The trigger logic module 320 generates the optical frequency reference sweep start signal that is supplied to the data acquisition and processing system 155 at the DAQ trigger input terminal.

The k-clock signal conditioning module 312 is used to generate the binary k-clock signals that are received by the data acquisition and processing system 155 at its k-clock input terminal.

Figure 3:
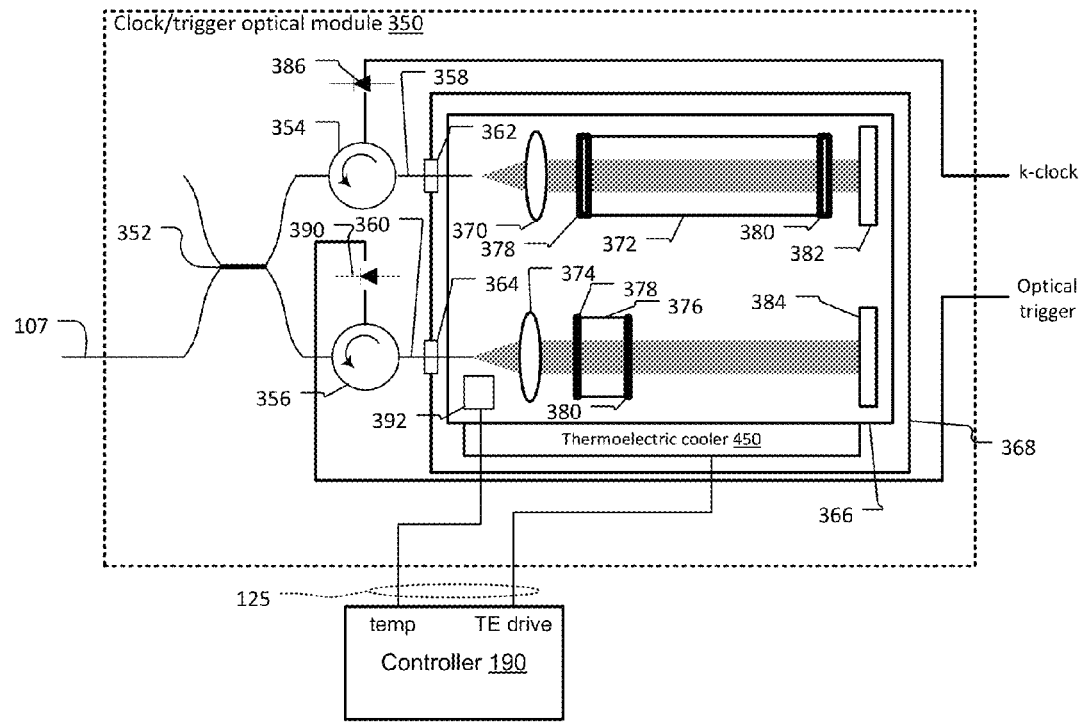
FIG. 3 is a schematic diagram illustrating the construction of a first embodiment of the clock/trigger optical module.

FIG. 3 illustrates one embodiment of the clock/trigger optical module 350. The optical fiber 107 from the swept source signal coupler 106 is provided to an optical module fiber coupler 352. This divides the swept optical signal between a k-clock circulator 354 and a frequency reference circulator 356. The output of the k-clock circulator 354 is an optical fiber 358 that enters a hermetic package 368 through a fiber feedthrough 362. The end face of the optical fiber 358 then terminates on an optical bench 366 that is located within the hermetic package 368.

In a similar vein, the frequency reference circulator 356 has an output fiber 360 that enters through fiber teed through 364 in the hermetic package 368. This fiber 360 is also secured to the optical bench 366.

The swept optical signal exiting from fiber 358 is collimated by a first lens 370 that is also secured to the optical bench 366. The swept optical signal is coupled into a k-dock spectral optical filter 372, which is an etalon in the illustrated embodiment and secured to the bench 366. In a similar vein, the swept optical signal exiting from the optical fiber 360 is collimated by a second lens 374 and coupled into a sweep start spectral filter 376, which is also an etalon in the illustrated embodiment and is also secured to the bench 366.

In a typical embodiment, the k-clock etalon 372 provides a relatively higher frequency or finer frequency reference. As a result, the k-clock etalon 372 is typically physically longer and certainly is longer in optical length, which takes into account its refractive index.

Both the k-clock etalon 372 and the sweep start etalon 376 include coated end surfaces 378 and 380. As a result, the etalons' spectral transfer functions provide reflection that is periodic in frequency.

Both the k-clock etalon 372 and the sweep start etalon 376 are operated in reflection in the illustrated embodiment. Reflected light returns back through the respective first and second tenses 370, 374 and into the respective optical fibers 358 and 360. The k-clock circulator 354 directs this returning light to a k-clock detector 386. Light reflected by the sweep start etalon 376 is coupled into the optical fiber 360 and directed by the frequency reference circulator 356 to the frequency reference detector 390 that generates the optical trigger signal. Elements 382 and 384 are beam absorbers/blocks/deflectors that ensure that no stray light is reflected back into fibers 358 and 360, respectively.

As a result, the k-clock detector 386 generates an optical frequency reference signal that indicates the sweeping of the swept optical signal through optical frequency sampling intervals, which defines the desired frequency interval at which the interference signals should be sampled by the data acquisition and processing system 155. The frequency reference optical detector 390 in turn generates the optical trigger signal that is used to generate the optical frequency reference sweep start signal which is used to signal to the data acquisition and processing system 155 that the swept optical signal has reached the sweep start frequency or other absolute reference frequency to ensure that sweep frequencies are stable between sweeps of the swept optical signal.

The optical lengths of the k-clock etalon 372 and the sweep start etalon 376 are temperature dependent. Thus, in order to stabilize the module 350, a thermoelectric cooler 450 is secured between the optical bench 366 and the hermetic package 368. A temperature detector 392 is preferably secured to the optical bench 366. The controller 190 functions as part of a temperature stabilization system, in one implementation. In more detail, the controller 190 receives the temperature information from the temperature detector 392. The controller then generates a thermoelectric cooler drive signal that is used to control the operation of the thermoelectric cooler 450 so that the temperature of the optical bench 366 and thus the k-clock etalon 372 and the sweep start etalon 376 are stable between sweeps of the swept optical signal.

In other embodiments, a bench heater is used in place of the thermoelectric cooler 450 for heating the optical bench 366 to temperatures higher than ambient temperature to control the temperature of the clock/trigger optical module 350.

In one embodiment, the material of the k-clock etalon 372 and the material of the sweep start etalon 376 are the same material such as fused silica, gallium arsenide, or gallium phosphide.

In another embodiment, the material of the k-clock etalon 372 and the sweep start etalon 376 are chosen to be different materials such as fused silica for the k-clock etalon 372 and gallium arsenide for the sweep start etalon 376. This system allows for temperature tuning of the clock/trigger optical module 350 to enable a change of the absolute optical frequency of the optical frequency reference sweep start signal and a change of the phase of the k-clock signal with respect to the sweep start signal.

Here, the sweep start etalon 376 is roughly 10 times more temperature sensitive than the k-clock etalon 372. Constant temperature control keeps both of these etalons 372, 376 stable in optical frequency. The temperature setpoint found when the system is calibrated allows for flexibility in setup. The temperature is set so that the sweep start etalon trigger point is near the desired starting wavelength. In addition, the sweep trigger transition is positioned midway between k-clock transitions. This ensures stability against starting the sweep on the wrong k-clock pulse.

Preferably, all of the optical components are secured to the optical bench 366 to ensure that they are all temperature stabilized through the operation of the temperature control system including the temperature detector 392, the controller 190, and the thermoelectric cooler 450.

Figure 4:
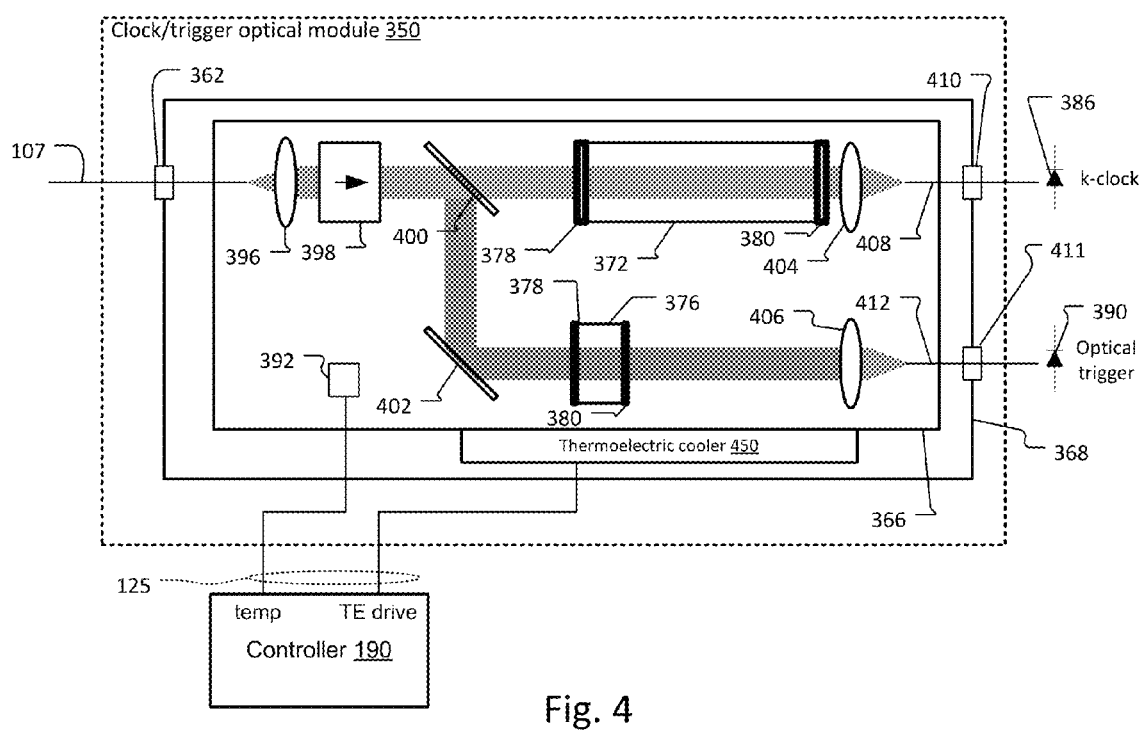
FIG. 4 is a schematic diagram illustrating the construction of a second embodiment of the clock/trigger optical module.

FIG. 4 illustrates an alternative embodiment of the clock/trigger optical module 350. In this embodiment, the optical fiber 107 from the swept source signal coupler 106 passes into the hermetic package 368 through a fiber feedthrough 362. The optical fiber 107 is secured onto the optical bench 366. A first lens 396 collimates the swept optical signal exiting from the end face of the fiber 107. The swept optical signal passes through an isolator 398 and then a beam splitter 400 directs part of the swept optical signal at a right angle while the remaining portion of the swept optical signal is coupled into the k-clock etalon 372. A fold mirror 402 reflects the portion of the swept optical signal that was reflected by the beam splitter 400 so that this portion of the swept optical signal is coupled into the sweep start etalon 376. The swept optical signal that is filtered by the k-clock etalon 372 in transmission is focused by a second tens 404 and coupled to a k-clock optical fiber pigtail 408. As a result, the filtered signal from the k-clock etalon 372 is transmitted out of the hermetic package 368 through a fiber feedthrough 410 to the k-clock detector 386. In a similar vein, the swept optical signal that is filtered by the sweep start etalon 376 is focused by a third lens 406 to enter a sweep start fiber pigtail 412 that transmits this filtered swept optical signal from the hermetic package 368, via feedthrough 411, to the optical trigger or frequency reference detector 390.

Similar to that discussed with respect to the previous embodiment, in the preferred implementation of the second embodiment, a temperature control system is also employed that uses a temperature detector 392 that is secured to the optical bench 366. This temperature signal is monitored by the controller 190 and used to drive the thermoelectric cooler 450, or other temperature control device.

Figure 5:
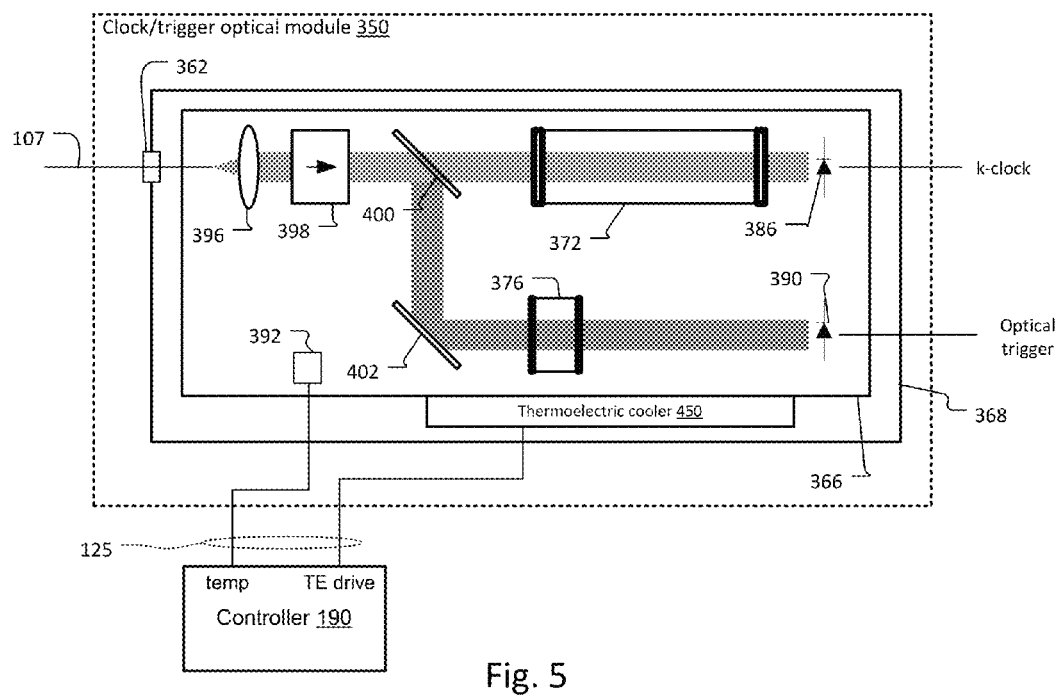
FIG. 5 is a schematic diagram illustrating the construction of a third embodiment of the clock/trigger optical module.

FIG. 5 illustrates a third embodiment of the clock/trigger optical module 350. In this embodiment, the k-clock detector 386 is located within the hermetic package 368 and specifically secured to the optical bench 366. Likewise, the frequency reference detector 390 that generates the optical trigger signal is also secured to the optical bench 366. This embodiment has advantages over the embodiment illustrated with respect to FIG. 4 in that only a single fiber feedthrough 362 is required. The k-clock signal and the optical trigger signal are taken from the hermetic package 368 electrically, which reduces manufacturing costs generally.

Figure 6:
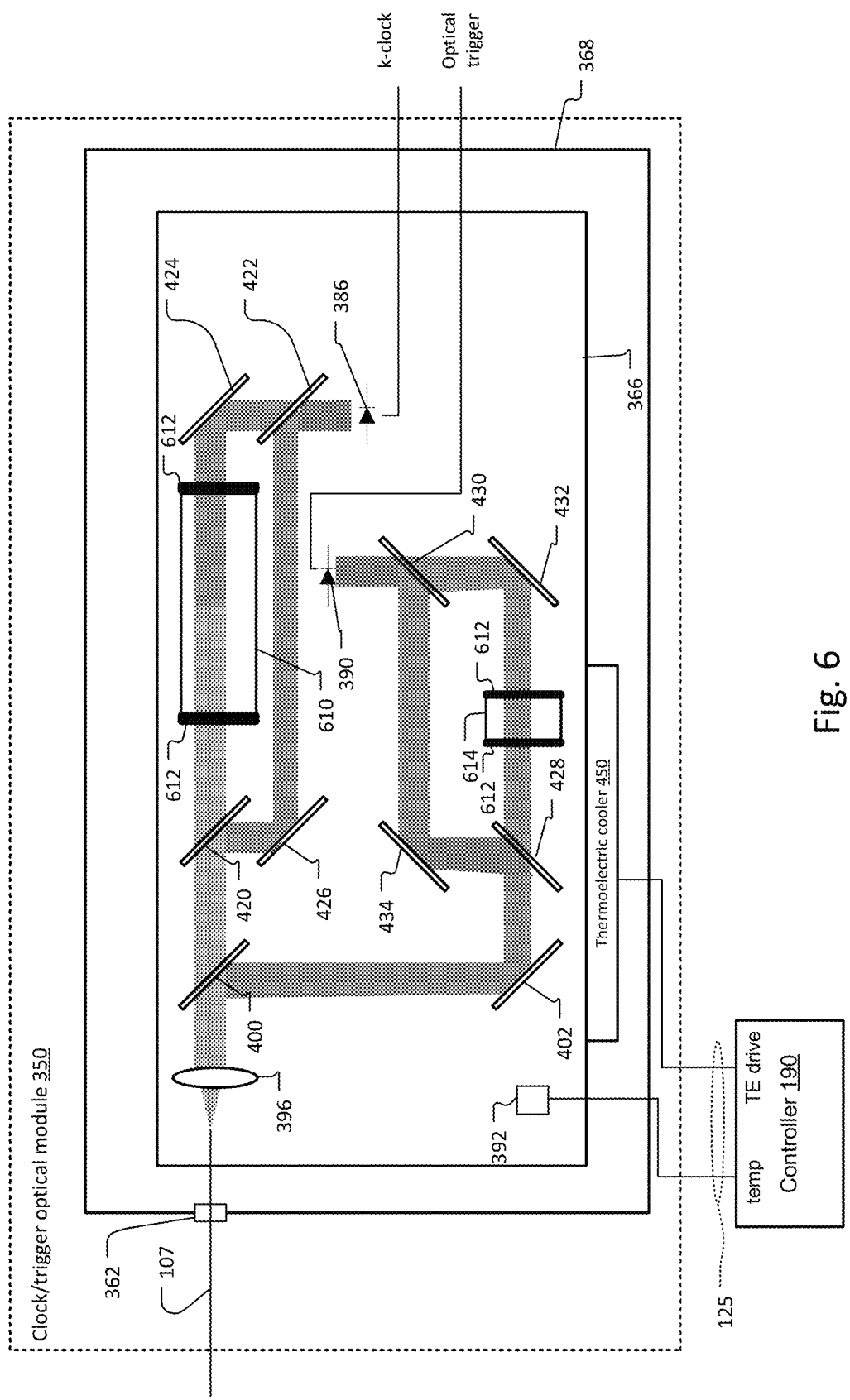
FIG. 6 is a schematic diagram illustrating the construction of a fourth embodiment of the clock/trigger optical module.

FIG. 6 shows still another embodiment of the clock/trigger optical module 350. This embodiment is useful at wavelengths where isolators and circulators are large, expensive, or have poor performance. This embodiment uses Mach-Zehnder interferometers as optical filters instead of etalons (as in FIGS. 3, 4 and 5) to create the optical trigger and k-clock signals. Specifically, the swept optical signal is received in the hermetic package 368 via a fiber feed-through 362. A fiber endface is secured onto the optical bench 366. The swept optical signal exiting from the optical fiber 107 is collimated by a first lens 396 and directed to abeam splitter 400. The beam splitter 400 divides the swept optical signal into two portions, one that is used to generate the k-clock signal and the other portion that is used to generate the optical trigger signal.

In more detail, the portion of the swept optical signal that is used to generate the k-clock signal is directed using a series of beam splitters 420, 422 and a series of fold mirrors 424, 426 to form a Mach-Zehnder clock interferometer that feeds the k-clock detector 386. The path mismatch between the two arms of the Mach-Zehnder interferometer is controlled by the length and refractive index of the k-clock delay element 610, which has antireflection (AR) coatings 612 on both the front and back facets.

in a similar fashion, the portion of the swept optical signal that is used to generate the optical trigger signal is similarly directed to a series of beam splitters 428, 430 and a series of fold mirrors 432, 434 that create the sweep start optical trigger Mach-Zehnder interferometer and then couple the filtered signal to the frequency reference detector 390. The Mach-Zehnder path mismatch is controlled by the length and refractive index of a sweep start delay element 614, which is similarly AR coated.

The materials used for the optical delay elements 610, 614 can be the same or different. As in the previous embodiments, selecting mismatched materials such as fused silica for the k-clock delay element 610 and gallium-arsenide for the sweep start delay element 614 allows for flexibility in temperature tuning. This allows placement of the optical reference trigger signal near a specific wavelength and placing the trigger mid-way between k-clock transitions for stability. This is controlled using the controller 190 to manage the temperature of the interferometers using the feedback temperature control based on the temperature detected by the temperature detector 392 and the operation of the thermoelectric cooler 450.

Figure 7:
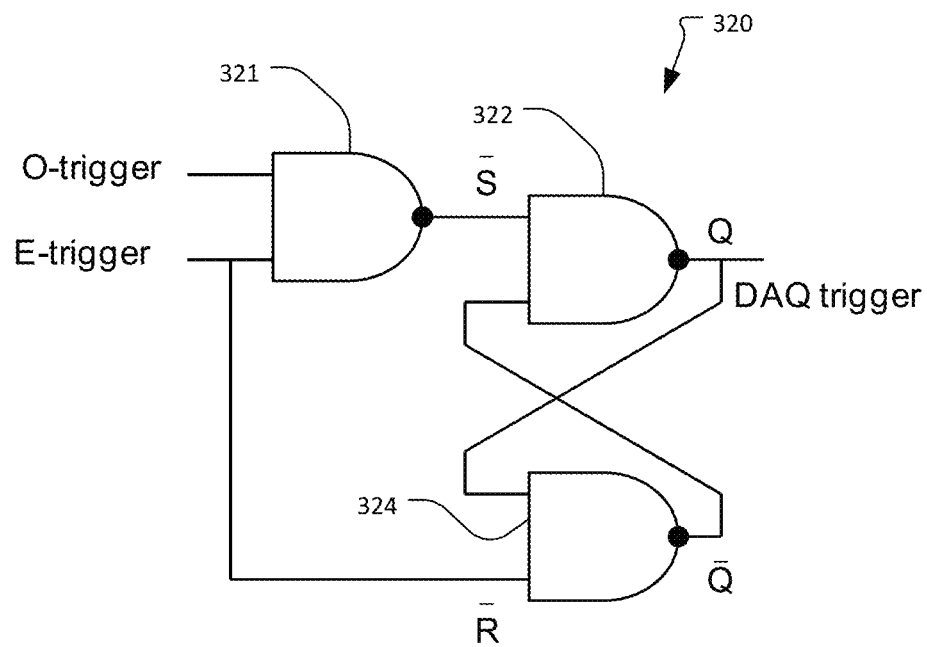
FIG. 7 is a logic gate diagram illustrating the construction of the trigger logic module according to one embodiment.

FIG. 7 illustrates one implementation of the trigger logic module 320. The optical trigger signal that is generated by the clock/trigger optical module 350 and possibly filtered by the optical trigger signal conditioning module 310 is logically combined with the electronic trigger signal (E-trigger) that is generated by the controller 190 in response to the electrical initiation of the sweep of the swept optical signal, i.e., the onset of the tunable element drive signal after allowing for any mechanical settling. These are combined in a first NAND gate 321. A cross connected pair of a second NAND gate 322 and a third NAND gate 324 form an SR flip-flop that is then used to generate the optical frequency reference sweep start signal that is used as the DAQ trigger signal to the data acquisition and processing system 155.

Figure 8:
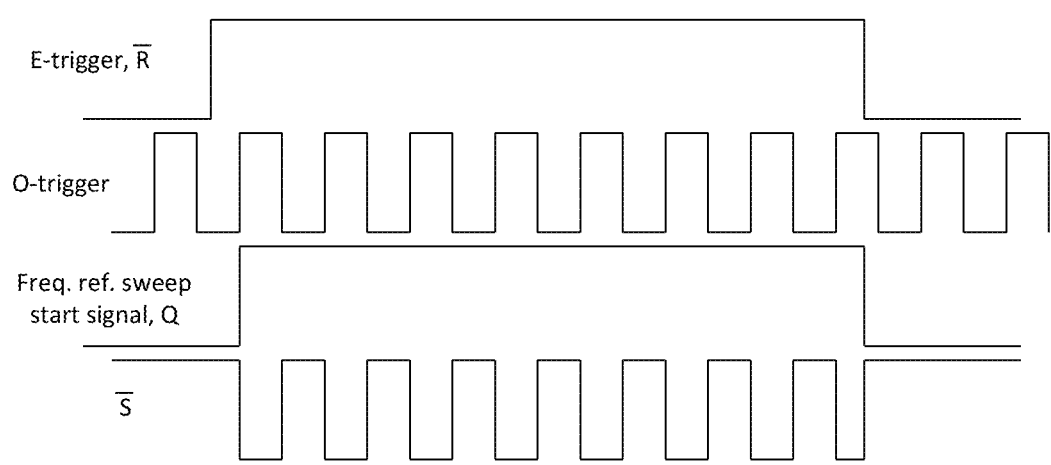
FIG. 8 is a wave form plot as a function of time showing the signals generated in the trigger logic module.

FIG. 8 is a timing diagram illustrating the signals that are generated in the trigger logic module 320. Specifically, the optical frequency reference sweep start signal becomes active on the leading edge of the optical trigger (O-trigger) signal that occurs alter the leading edge of the electronic trigger (E-trigger) signal. The optical frequency reference sweep start signal stays active until the fall of the electronic trigger signal only on the next falling edge of the optical trigger signal.

Figure 9:
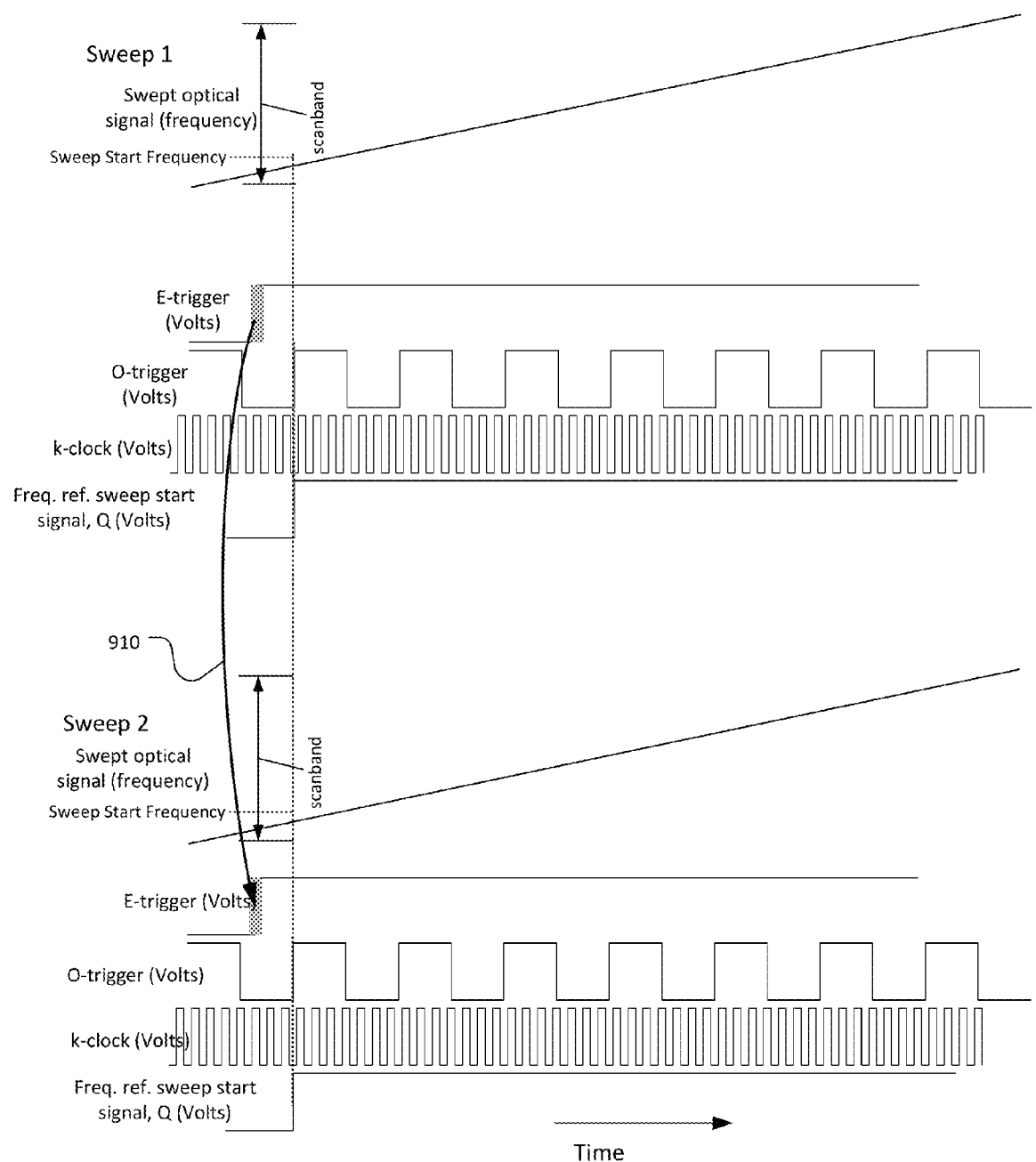
FIG. 9 is a plot showing the optical frequency of the swept optical signal, electronic trigger signal, the optical trigger signal, the k-dock signal, and the optical frequency reference sweep start signal as a function of time for two sweeps of the swept optical signal.

FIG. 9 illustrates the operation of the clock system 300 as the swept optical signal is frequency scanned through scan band.

The plot shows the scanning of the frequency of the swept optical signal through the scanband and the generation of the k-clock with this scanning. The k-clock is used to indicate every time the swept optical signal has tuned through another the optical frequency sampling interval so that the interference signal can be sampled. Specifically, by sampling in response to the k-clock, evenly spaced samples of the interference signal are generated in the frequency domain.

In general, the system is directed to suppressing sweep to sweep jitter in the signals that are generated by the controller 190 and the tuning of the swept source system 100. FIG. 9 shows a situation with reference to the optical trigger, so that the E-trigger signal shows timing jitter in its rising edge, see arrow 910. As a result, the electronic trigger (E-trigger signal) generated by the controller 190 is only used as a coarse indicator of the beginning of the sweep of the swept optical signal.

Instead, the leading edge of the optical trigger signal (O-trigger signal) that occurs after the electronic trigger signal is used to generate the optical frequency reference sweep start signal that is used to indicate to the data acquisition and processing system 155 that the sampling of the interference signal should commence by making one sample at each transition of the k-clock for a specified number of samples. Since this leading edge of the optical trigger signal is generated based on a temperature stabilized system of etalons or interferometers or other optical filters in the clock/trigger optical module 350, it will be the same from sweep to sweep, i.e. successive sweeps such as sweep 1 and sweep 2, of the swept optical signal through the scan band. As a result, the clock system 300 ensures that the sampling of the interference signal occurs at exactly or nearly exactly the same frequency/wavelength on every A-line scan associated with the sweep of the swept optical signal over the scan band.

Figure 10A:
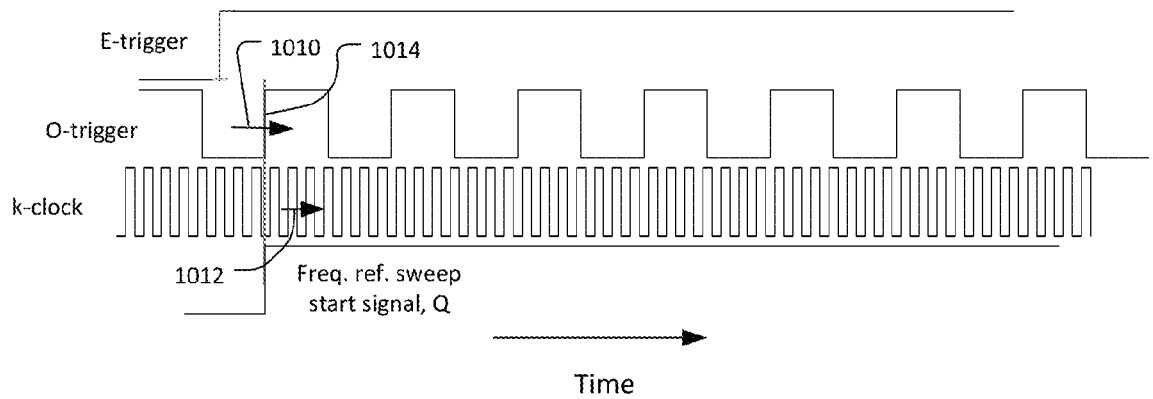
FIGS. 10A and 10B are plots showing the electronic trigger signal, the optical trigger signal, the k-clock signal, and the optical frequency reference sweep start signal as a function of time illustrating the temperature tuning of the clock/trigger module when different materials are used in the spectral filters, e.g. etalons and/or interferometers.
Figure 10B:
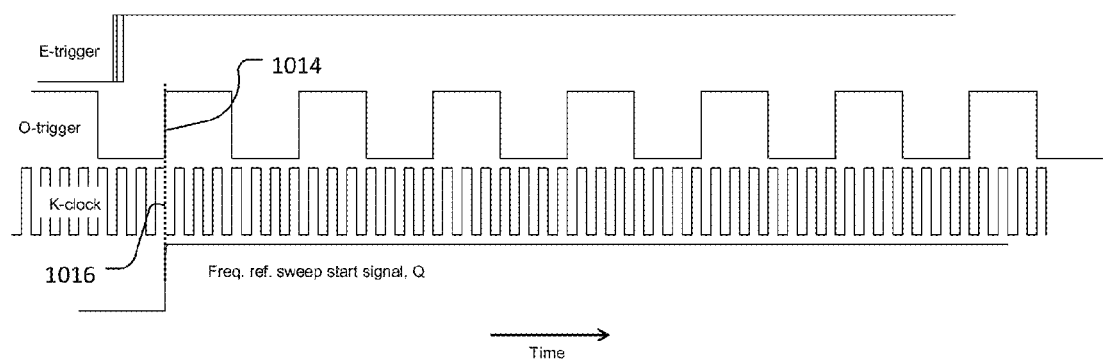

FIG. 10A and FIG. 10B illustrate the temperature tuning of the clock/trigger optical module 350 when different materials are used in the spectral filters, e.g. etalons and/or interferometers.

The specific example where 1) the sweep start etalon 376, in the case of the embodiments of FIGS. 3-5, or the sweep start delay element 614, in the case of the embodiment of FIG. 6, are gallium arsenide, and 2) the k-clock etalon 372, in the case of the embodiments of FIGS. 3-5, and the k-clock delay element 610, in the case of the embodiment of FIG. 6, are fused silica.

There is about an order of magnitude difference in the temperature sensitivity between the two materials, gallium arsenide and fused silica. Thus, the frequency of the swept optical signal at which the optical trigger (O-trigger) is generated is adjusted relative to the frequencies of the swept optical signal at which the k-clock signals are generated. This adjustment is made by changing the temperature of clock/trigger optical module 350. This has the effect of changing the timing of the signals as illustrated by the arrows 1010, 1012 relative to each other for the same electronic trigger (E-trigger) timing.

In one embodiment, the controller 190 preferably sets the temperature of the clock/trigger optical module 350 so that the sweep start etalon trigger point 1014 of the optical trigger signal is near the desired starting frequency or wavelength of the swept optical signal. In addition, the sweep start trigger point, rising edge 1014 of the optical trigger signal (O-trigger) signal, is positioned midway between k-clock transitions of the k-clock signal. This ensures stability against starting the sweep on the wrong k-clock pulse.

This enables the controller 190 to achieve the preferred k-clock alignment to the optical trigger, which is shown in FIG. 10B. The controller 190 thermally tunes the clock/trigger optical module 350 to align the trigger, rising edge 1014 of the optical trigger signal (O-trigger), midway between k-pulses. This will ensure there are no mistakes in clocking.

If the rising edge of the k-clock were aligned with the rising edge of the trigger, the situation would be unstable. Depending on noise, there could be a shift by one clock period on different sweeps. The preferred alignment is to align the rising edge 1014 of the optical trigger signal (O-trigger) with the falling edge 1016 of the k-clock signal.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical coherence analysis system, comprising:
   an interferometer that divides a swept optical signal between a reference arm and a sample arm and combines optical signals returning from the reference arm and the sample arm to generate an interference signal;
   an optical swept source system that generates the swept optical signal;
   a clock system that generates k-clock signals in response to frequency sweeping of the swept optical signal and generates an optical frequency reference sweep signal indicating that the frequency of the swept optical signal is at a particular sweep frequency, wherein the clock system includes a clock/trigger optical module that comprises a k-clock spectral filter that filters the swept optical signal based on an optical frequency sampling interval to generate the k-clock signals and a sweep start filter that indicates a sweep start frequency of the swept optical signal by spectrally filtering the swept optical signal to generate an optical trigger signal; and
   a detection system that detects the interference signal in response to the k-clock signals to generate evenly spaced samples of the interference signal and uses the optical frequency reference sweep signal to stabilize sampling across sweeps of the swept optical signal.

2. An optical coherence analysis system as claimed in claim 1, further comprising a trigger logic module that generates the optical frequency reference sweep signal to indicate a start of the sweep based on the optical trigger signal and an electronic trigger signal generated by a controller of the optical swept source system.

3. An optical coherence analysis system as claimed in claim 1, wherein the k-clock spectral filter is an etalon and the sweep start filter is an etalon.

4. An optical coherence analysis system as claimed in claim 1, wherein the k-clock spectral filter is an interferometer and the sweep start filter is an interferometer.

5. An optical coherence analysis system as claimed in claim 1, further comprising an optical trigger signal conditioning module for forming the optical trigger signal.

6. An optical coherence analysis system as claimed in claim 1, further comprising a k-clock signal conditioning module for forming the k-clock signals.

7. An optical coherence analysis system as claimed in claim 1, further comprising a controller for generating a tunable element drive signal to the optical swept source system.

8. An optical coherence tomography system, comprising:
   an interferometer that divides a swept optical signal between a reference arm and a sample arm and combines optical signals returning from the reference arm and the sample arm to generate an interference signal;
   an optical swept source system that generates the swept optical signal;
   a clock system that generates k-clock signals in response to frequency sweeping of the swept optical signal and generates an optical frequency reference sweep signal indicating that the frequency of the swept optical signal is at a particular sweep frequency, wherein the clock system comprises a clock/trigger optical module that generates the k-clock signals with a k-clock spectral filter that filters the swept optical signal and an optical trigger signal to indicate a sweep start frequency with a sweep start spectral filter that filters the swept optical signal; and
   a detection system that detects the interference signal in response to the k-clock signals to generate evenly spaced samples of the interference signal and uses the optical frequency reference sweep signal to stabilize sampling across sweeps of the swept optical signal.

9. An optical coherence analysis method, comprising:
   dividing a swept optical signal between a reference arm and a sample arm and combining optical signals returning from the reference arm and the sample arm to generate an interference signal;
   generating k-clock signals in response to frequency sweeping of the swept optical signal by spectrally filtering the swept optical signal based on an optical frequency sampling interval;
   generating an optical frequency reference sweep signal indicating that the frequency of the swept optical signal is at a particular sweep frequency by spectrally filtering the swept optical signal to generate an optical trigger signal to indicate the sweep frequency;

detecting the interference signal in response to the k-clock signals to generate evenly spaced samples of the interference signal in the frequency domain; and using the optical frequency reference sweep signal to stabilize the sweeps of the swept optical signal with respect to each other.

10. A method as claimed in claim 9, further comprising generating the optical frequency reference sweep signal to indicate a start of the sweep based on the optical trigger signal and an electronic trigger signal.

11. A method as claimed in claim 9, wherein the filtering is performed with etalons.

12. A method as claimed in claim 9, wherein the filtering is performed with interferometers.

13. A method as claimed in claim 9, further comprising signal conditioning the optical trigger signal.

14. A method as claimed in claim 9, further comprising signal conditioning the k-clock signals.

15. An optical coherence analysis method, comprising:

dividing a swept optical signal between a reference arm and a sample arm and combining optical signals returning from the reference arm and the sample arm to generate an interference signal;

generating the k-clock signals in response to frequency sweeping of the swept optical signal by spectrally filtering the swept optical signal;

generating an optical frequency reference sweep signal indicating that the frequency of the swept optical signal is at a particular sweep frequency by generating an optical trigger signal to indicate the sweep start frequency by spectrally filtering the swept optical signal;

detecting the interference signal in response to the k-clock signals to generate evenly spaced samples of the interference signal in the frequency domain; and using the optical frequency reference sweep signal to stabilize the sweeps of the swept optical signal with respect to each other.

16. An optical coherence tomography system as claimed in claim 8, further comprising a trigger logic module that generates the optical frequency reference sweep signal to indicate a start of the sweep based on the optical trigger signal and an electronic trigger signal generated by a controller of the optical swept source system.

17. An optical coherence tomography system as claimed in claim 8, wherein the k-clock spectral filter is an etalon and the sweep start filter is an etalon.

18. An optical coherence tomography system as claimed in claim 8, wherein the k-clock spectral filter is an interferometer and the sweep start filter is an interferometer.

19. An optical coherence tomography system as claimed in claim 8, further comprising an optical trigger signal conditioning module for forming the optical trigger signal.

20. An optical coherence tomography system as claimed in claim 8, further comprising a k-clock signal conditioning module for forming the k-clock signals.

21. An optical coherence tomography system as claimed in claim 8, further comprising a controller for generating a tunable element drive signal to the optical swept source system.

* * * * *